C. B. PAYSON.
Ice-Tongs.
No. 207,204. Patented Aug. 20, 1878.
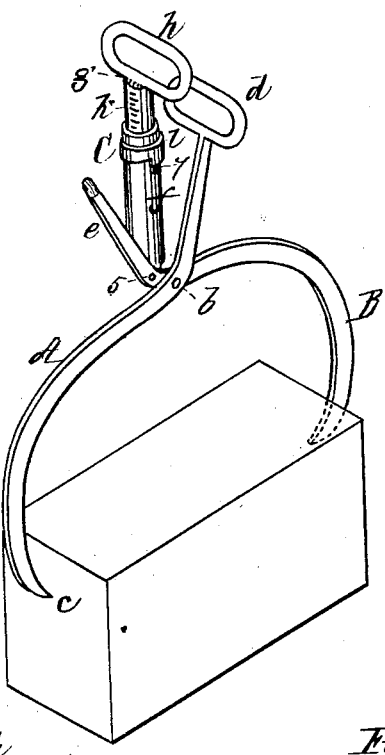
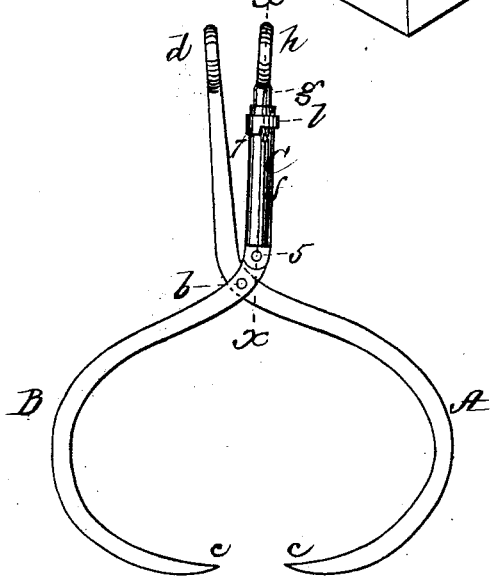
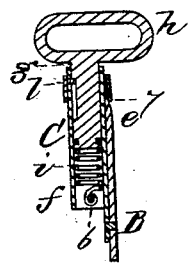
Witnesses,
W. J. Cambridge
H. R. Perkins.
Inventor,
Calvin B. Payson,
Per Teschemacher & Stearns,
Attorneys.

UNITED STATES PATENT OFFICE.

CALVIN B. PAYSON, OF BOSTON, MASSACHUSETTS, ASSIGNOR TO HIMSELF AND WILLIAM E. BRIGHAM, OF SAME PLACE.

IMPROVEMENT IN ICE-TONGS.

Specification forming part of Letters Patent No. 207,204, dated August 20, 1878; application filed August 2, 1878.

*To all whom it may concern:*

Be it known that I, CALVIN B. PAYSON, of Boston, in the county of Suffolk and State of Massachusetts, have invented certain Improvements in Tongs for Grasping Ice and other Substances, of which the following is a full, clear, and exact description, reference being had to the accompanying drawings, making part of this specification, in which—

Figure 1 is a perspective view of a pair of ice-tongs constructed in accordance with my invention. Fig. 2 is a side elevation of the same with the parts in a different position. Fig. 3 is a vertical section through the same on the line $x\ x$ of Fig. 2.

This invention relates to an improvement on the tongs for which Letters Patent of the United States are about to issue to William E. Brigham, in which a weighing device is applied to one of the levers of the tongs. These tongs answer well in all cases except when a large piece of ice or other substance is grasped, which causes the handles at the upper ends of the levers to be widely separated, in which event some little friction is produced between the stationary and movable portions of the weighing device in consequence of their not occupying a vertical position when the ice or other substance is lifted by the tongs, the result of which is that the weight is not ascertained with perfect accuracy.

My invention has for its object to overcome this difficulty; and consists in a pair of tongs for grasping ice and other substances, having a weighing device pivoted either to one of its levers above the point where they are pivoted together, or directly at the point where the levers are pivoted together, which causes the weighing device to always hang vertically when in use without regard to the distance apart of the upper portions of the levers of the tongs, thus avoiding the friction incident to the construction above referred to, and preventing any liability of inaccuracy in weighing.

My invention also consists in a locking device for rigidly clamping the weighing device to one of the levers of the tongs, so as to prevent it from swinging on its pivot when not in use.

To enable others skilled in the art to understand and use my invention, I will proceed to describe the manner in which I have carried it out.

In the said drawings, A B represent the two arms or levers of a pair of ice-tongs, which are pivoted together at $b$, and provided, as usual, at their lower extremities with inwardly-projecting points $c$, for grasping and holding the ice between them. The lever A is provided at its upper end with a loop or handle, $d$, while the upper portion, $e$, of the lever B is made tapering, as seen in Fig. 1. To this portion $e$, at a point, 5, a little above the pivot $b$, is pivoted at its lower end the cylindrical casing $f$ of a spring weighing device, C, the sliding rod $g$ of which carries at its upper end a loop or handle, $h$, similar to the handle $d$. To the bottom of the sliding rod $g$ is attached a spiral spring, $i$, the lower end of which is secured to the bottom of the casing $f$ by a pin, 6.

The sliding rod $g$ is provided on one side with a graduated scale, $k$, for the purpose of indicating above the upper edge of the casing the distance to which it is drawn out against the resistance of the spring $i$ by the weight of the piece of ice grasped between the levers A B when the tongs are held up by the handle $h$; and as the spring is properly adjusted for the purpose, the weight of the piece of ice will be accurately indicated on the scale $k$, as desired. The casing $f$ of the weighing device is locked rigidly against the side of the portion $e$ of the lever B, so as to prevent the casing $f$ from swinging on its pivot 5 when the tongs are not in use, by means of a clamping-ring, $l$, which is turned so as to bring its lip 7 over the upper end of the portion $e$; and, if desired, the tongs can be used with the weighing device in this position if the piece of ice is small; but when a large piece of ice is grasped, causing the upper ends of the levers A B to be widely separated, the ring $l$ is turned so as to release the upper end of the portion $e$, when the weighing device will assume a vertical position, as seen in Fig. 1, without regard to the distance apart of the upper portions of the levers A B, thus avoiding the friction which would otherwise be produced between the rod $g$ and the casing $f$, and preventing any liability of an incorrect weight being indicated on the scale $k$.

Instead of the ring $l$, any other suitable device may be used for locking the weighing device C rigidly to the portion $e$ of the lever B, to prevent it from swinging on its pivot; or the locking device may be dispensed with altogether, if desired.

The construction of the spring weighing device C may also be varied, and it may be pivoted at any portion of its length to either one of the levers A or B above the pivot $b$, or at the point $b$, where the levers are pivoted together; but I prefer to pivot it at the point shown.

The above described combined tongs and scales will be found extremely convenient for the use of retail ice-dealers and families; and it may be used for grasping other substances than ice—for example, hay, cotton, &c.—the size of the implement being proportioned to adapt it to the use to which it is to be applied.

What I claim as my invention, and desire to secure by Letters Patent, is—

1. In combination, with a pair of tongs for grasping ice or other substance, a spring weighing device, C, pivoted to one of the levers A or B above the pivot $b$, or at the point where they are pivoted together, in order that it may hang vertically when in use, substantially as and for the purpose set forth.

2. The clamping-ring $l$, or its equivalent, in combination with the pivoted weighing device C and lever B, substantially as and for the purpose described.

Witness my hand this 30th day of July, A. D. 1878.

CALVIN B. PAYSON.

In presence of—
   P. E. TESCHEMACHER,
   W. J. CAMBRIDGE.